United States Patent
Metcalfe et al.

(10) Patent No.: US 9,357,101 B1
(45) Date of Patent: May 31, 2016

(54) SIMULTANEOUS DUPLEX MAGNIFICATION COMPENSATION FOR HIGH-SPEED SOFTWARE IMAGE PATH (SWIP) APPLICATIONS

(71) Applicant: Xerox Corporation, Norwalk, CT (US)

(72) Inventors: David Jon Metcalfe, Marion, NY (US); Ryan David Metcalfe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/672,511

(22) Filed: Mar. 30, 2015

(51) Int. Cl.
*H04N 1/04* (2006.01)
*H04N 1/40* (2006.01)

(52) U.S. Cl.
CPC .................. *H04N 1/40068* (2013.01)

(58) Field of Classification Search
CPC ............. G11B 27/00; H04N 21/42646; H04N 21/4325; H04N 21/816; H04N 5/445; H04N 5/85; H04N 9/8042; H04N 9/8205; H04N 9/8227; H04N 1/387; H04N 1/3875; H04N 21/234363; H04N 21/8153; H04N 3/1531
USPC .................. 348/42, E13.001, E3.02, E3.022, 348/E3.024, E5.055, 294, 297, 298, 302, 348/319; 358/1.18, 1.1, 1.12, 1.16, 1.9, 358/3.26, 401, 448, 450, 501, 527, 530, 358/538, 474; 386/248, E5.003, E9.011; 345/660; 38/448
See application file for complete search history.

(56) References Cited

U.S. PATENT DOCUMENTS

| | | | |
|---|---|---|---|
| 5,099,336 A * | 3/1992 | Moriya | G03G 15/0131 358/300 |
| 5,351,082 A * | 9/1994 | Kasagi | 348/294 |
| 5,450,211 A | 9/1995 | Kanai et al. | |
| 5,553,201 A * | 9/1996 | Muramatsu | 358/1.9 |
| 6,178,272 B1 | 1/2001 | Segman | |
| 6,226,105 B1 * | 5/2001 | Fukushi | 358/452 |
| 6,236,418 B1 | 5/2001 | Yamakawa | |
| 6,285,463 B1 | 9/2001 | Lin et al. | |
| 6,330,422 B1 * | 12/2001 | Sato et al. | 399/382 |
| 6,384,937 B1 * | 5/2002 | Matama | G06T 5/004 358/1.9 |
| 6,462,837 B1 | 10/2002 | Tone | |
| 6,825,857 B2 | 11/2004 | Harasimiuk | |
| 7,477,323 B2 | 1/2009 | Chou | |
| 7,903,869 B2 * | 3/2011 | Forutanpour | H04N 1/40012 382/162 |
| 8,045,218 B2 | 10/2011 | Qiao et al. | |
| 8,145,013 B1 | 3/2012 | Sahu et al. | |
| 8,428,393 B2 | 4/2013 | Kraft | |
| 8,565,554 B2 | 10/2013 | Lu et al. | |
| 8,610,944 B2 | 12/2013 | Xu et al. | |
| 8,714,692 B1 * | 5/2014 | Metcalfe | B41J 2/2139 347/19 |

(Continued)

*Primary Examiner* — Negussie Worku
(74) *Attorney, Agent, or Firm* — Gibb & Riley, LLC

(57) ABSTRACT

An image processor determines the number of pixels to be added/removed within each row/column of pixels of an image to accomplish a given image enlargement/reduction. The image processor evenly distributes pixels that are to be added/removed along the full length of each of the rows or columns of pixels, and adds/removes pixels in a process that identifies a set of original pixels that are immediately adjacent to the pixel to be added/removed. The image processor then replaces each of the sets of the original pixels with a replacement set (that has one more/less pixel relative to the set of original pixels). Also, for each pixel that will be added/removed, the image processor determines data values for replacement pixels in each of the replacement sets by weighting data values from original pixels in the sets of original pixels. The image processor outputs an enlarged/reduced size version of the input image.

16 Claims, 14 Drawing Sheets

(56) References Cited

U.S. PATENT DOCUMENTS

| | | |
|---|---|---|
| 8,786,614 B2 | 7/2014 | Curry et al. |
| 8,985,723 B2 * | 3/2015 | Metcalfe ................ B41J 2/2139 347/14 |
| 9,179,039 B2 * | 11/2015 | Metcalfe ................ H04N 1/393 |
| 9,262,704 B1 * | 2/2016 | Metcalfe ............ G06K 15/1876 |
| 2002/0118019 A1 * | 8/2002 | Nomura ........................ 324/509 |
| 2003/0189730 A1 * | 10/2003 | Enomoto ..................... 358/3.26 |
| 2010/0201995 A1 * | 8/2010 | Yoshida .......................... 358/1.2 |
| 2011/0050723 A1 * | 3/2011 | Tokunaga et al. ............. 345/627 |
| 2011/0187817 A1 * | 8/2011 | Sasaki et al. .................... 348/42 |
| 2012/0182321 A1 * | 7/2012 | Kondo et al. ................. 345/660 |
| 2013/0121595 A1 * | 5/2013 | Kawatani ................. G06K 9/32 382/199 |
| 2013/0135652 A1 * | 5/2013 | Kobayashi ........... H04N 1/0097 358/1.13 |

* cited by examiner

SIMULTANEOUS DUPLEX MAGNIFICATION COMPENSATION FOR HIGH-SPEED SOFTWARE IMAGE PATH (SWIP) APPLICATIONS

BACKGROUND

Systems and methods herein generally relate to image processors and image processing and more particularly to image enlargement and reduction in, for example, simultaneous duplex magnification compensation processes for high-speed software image path (SWIP) applications.

Simultaneous duplex (two-sided) scanning uses a document feeder that can scan both sides of a page at once by moving the document past two individual scan modules. The document feeder employs a constant velocity transport (CVT) to move the document past the stationary scan stations, thereby reducing the time for copying or scanning 2-sided originals. Unfortunately, the mechanical design and optics of each scanning station are not exact and can therefore generate subtle, fast-scan magnification differences between the two sides of the document. Although these magnification differences are relatively small and difficult to observe when comparing the rendered prints, high-end devices generally require that the two sides generate equivalent image quality with respect to the front and backside originals, especially for certain situations. The need to adjust for these small magnification differences is therefore very useful.

Therefore, in duplex scanning and copy applications, there are slight magnification differences between the front and backside of the captured images due to variations in optics, mechanical tolerances, etc., and additional scaling adjustments are performed to precisely match the two sides. This is known as duplex magnification compensation (DMC). Traditional scaling processes, however, process each side in its entirety (adjust the magnification of every pixel) even when only subtle magnification adjustments are required. Depending upon the scaling process selected, the amount of calculations required to achieve a 9% image reduction, for example, can be as extensive as 0.1% reduction. Although generally not an issue in hardware, duplex magnification compensation can consume precious processor cycles to simply apply side 1-to-side 2 scaling adjustments (which can be as small as +/−1%) and can therefore significantly degrade overall SWIP performance.

Image scaling is commonly performed in hardware (field programmable gate arrays (FPGAs), application-specific integrated circuits (ASICs), etc.) mainly because lower-cost microprocessors available in the past could not achieve the rated speeds used by advanced classes of copy/print reprographic machines. However, for the next generation of office multi-function device (MFD) products, there are plans to leverage the latest competitive multi-core processors in order to offer a more robust and flexible image-path architecture. To that end, a software-based image path (SWIP) solution is actively being developed to replace the traditional hardware-based solution. The development of new image-processing techniques are therefore useful in order to provide an efficient, high-speed copy path solution by leveraging the capabilities of advanced processors.

SUMMARY

Systems and methods herein partition images into discrete "grid" locations that either remove or insert pixels in order to provide image enlargement and/or reduction capabilities. Systems and methods herein exploit the single-instruction, multiple-data (SIMD) technology and multi-threading features available within multi-core processors that are particularly suited for duplex magnification compensation applications, especially where the amount of fast-scan scaling adjustment is limited to approximately +/−1% as it is in duplex magnification compensation processes. Instead of using the extensive seed gridpoint calculations employed in traditional scaling processes, the systems and methods herein distribute these image adjustments in a weighted fashion across a number of fast-scan pixels conducive to providing high-speed processing via SIMD operations. The image-quality produced by systems and methods herein is nearly equivalent (and in some cases, superior) to other well-known pixel interpolation techniques, but the systems and methods herein accelerate the overall image processing throughput rate when compared to traditional methods.

Exemplary methods herein receive, into an image processor, an input image made up of original image pixels, arranged in parallel rows of pixels and parallel columns of pixels. The rows of pixels are perpendicular to the columns of pixels and the terms "rows" and "columns" are used interchangeably herein as the distinction between the two is dependent only upon the orientation of the image. Also, these methods identify the amount of image enlargement or image reduction that is to be performed on the input image (using the image processor) and such can be manually input or automatically determined.

Rather than adjusting the magnification of every single pixel in the image, these methods add or remove pixels to or from the original image to perform the image enlargement or image reduction, which saves a substantial amount of processor resources. Thus, these methods determine the number of pixels that are to be added or removed within each of the rows (or columns) of pixels to make the identified amount of image enlargement or image reduction (using the image processor). In one simplified example, the process of determining the number of pixels to be added or removed within each of the rows of pixels can be performed by multiplying the amount of image enlargement or image reduction (in the form of a percentage) by the total number of pixels within each of the rows of pixels.

These methods evenly distribute the pixels that are to be added or removed along the full length of each of the rows of pixels, so as to position the pixels to be added or removed at regular, equal intervals along the full length of each of the rows of pixels (using the image processor). In one example, to evenly distribute the pixels in the rows, the methods herein can divide the total number of pixels within each of the rows by the number of pixels that are to be added or removed, and the resulting value from that division process indicates the regular, equal pixel spacing between added/removed pixels.

Rather than just removing some pixels from the image, in order to maintain image quality, these methods add or remove pixels in a process that eliminates artifacts that are created by the additional or missing pixels. Specifically, for each pixel that is to be added or removed, the methods identify a set of original pixels (e.g., 8 original pixels) that are in the same row as, and immediately adjacent to, each pixel that is to be added or removed. This process of identifying the set of original pixels positions the location of the each pixel that is to be added or removed at the approximate center of the set of original pixels, along the corresponding row of pixels.

In the adding/removing process, these methods replace each set of original pixels with a replacement set of pixels. Each replacement set of pixels has, for example, one less pixel (e.g., 7 pixels) or one more pixel (e.g., 9 pixels) relative to the set of original pixels (based on whether image enlargement or image reduction is to be performed on the image). Further, each of the replacement pixels (in a corresponding replacement set of pixels) has a different data value relative to a corresponding original pixel (in a corresponding one of the sets of original pixels) because of the weighting process discussed below.

Additionally, in the adding/removing process, these methods determine data values for replacement pixels in each of the replacement sets of pixels by weighting data values from original pixels in the set of original pixels. These original pixels that are used in the weighting process can include a first pixel within the set of original pixels that has the same corresponding position as the replacement pixel, and another pixel within the set of original pixels that is adjacent to the first pixel. The weighting amounts are based on the amount of image enlargement or image reduction that is to be performed on the input image, and on the number of pixels in the replacement set of pixels.

After completing the process of adding or removing the pixels, these methods output an enlarged or reduced size version of the input image from the image processor.

Exemplary image processing devices herein include, among other components, a device input receiving an input image. The input image is made up of image pixels arranged in parallel rows of pixels and parallel columns of pixels (the rows of pixels are perpendicular to the columns of pixels). Also, an image processor is operatively connected to the device input, and a device output is operatively connected to the image processor.

The image processor identifies the amount of image enlargement or image reduction to be performed on the input image (such is automatically determined or manually provided). Further, the image processor determines the number of pixels to be added or removed within each of the rows (or columns) of pixels to accomplish the image enlargement or image reduction. The image processor can determine the number of pixels to be added or removed within each of the rows of pixels by multiplying the amount of image enlargement or image reduction (in the form of a percentage) by the total number of pixels within each of the rows of pixels.

The image processor evenly distributes the pixels that are to be added or removed along the full length of each of the rows of pixels, so as to position the pixels to be added or removed at regular, equal intervals along the full length of each of the rows of pixels. To evenly distribute the pixels in the rows, the image processor divides the total number of pixels within each of the rows by the number of pixels that are to be added or removed, and the resulting value from that division process indicates the regular, equal pixel spacing between added/removed pixels.

The image processor adds or removes those pixels that will be added or removed in a process that eliminates artifacts that are created by the additional or missing pixels. Specifically, for each pixel that will be added or removed, the image processor identifies a set of original pixels that are immediately adjacent to the pixel that is to be added or removed. Also, when identifying this set of original pixels, the image processor positions the location of the each pixel that is to be added or removed at the approximate center of the set of original pixels, along a corresponding row of the rows of pixels The image processor then replaces each of the set of original pixels with a replacement set of pixels. Each of the replacement sets of pixels has one less pixel or one more pixel relative to the set of original pixels, based on whether image enlargement or image reduction is to be performed on the image. Also, each of the replacement pixels in a corresponding replacement set of pixels has a different data value, relative to a corresponding original pixel (in a corresponding set of original pixels).

Also, for each pixel that will be added or removed, the image processor determines data values for replacement pixels in each of the replacement set of pixels by weighting data values from original pixels in the set of original pixels. These original pixels that are used in the weighting process can include a first pixel within the set of original pixels that has the same corresponding position as the replacement pixel, and another pixel within the set of original pixels that is adjacent to the first pixel. The weighting values can be based on the amount of image enlargement or image reduction to be performed on the input image, and on the number of pixels in the replacement set of pixels. After the process of adding or removing the pixels is complete, the image processor outputs an enlarged or reduced size version of the input image.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, image enlargement and reduction processes, such as duplex magnification compensation, can consume precious processor cycles (e.g., especially when simply applying side 1-to-side 2 scaling adjustments by as little as +/−1%) and can therefore significantly degrade overall SWIP performance. In view of this, the systems and methods herein partition images into discrete "grid" locations and either remove or insert pixels in order to provide image enlargement and/or reduction capabilities, and the systems and methods herein distribute these image adjustments in a weighted fashion across a number of fast-scan pixels that are processed in parallel to dramatically increase the speed at which the image enlargement/reduction is performed, and to reduce utilization of processor resources.

Image scaling that resizes digital images has widespread applications in the multi-media handheld devices realm (i.e. mobile phones, personal digital assistants (PDAs), handheld game consoles, mobile media players, digital cameras, etc.). Image magnification is likewise used within the multi-function reprographic device (MFD) environment, where the rated speed of the scanner ultimately dictates the rate at which the video is processed.

As previously mentioned, digital scaling can be computationally intensive. Multi-threading alone works well in the theoretical realm, where it can be presumed that there are an unlimited number of threads that can be accessed at a time; however, in the real world, multi-threading actually results in minimal acceleration, for example, when multi-threading is performed within a copy-path consisting of multiple image-processing nodes. In other words, relying on multi-threading to simply accelerate the processing of an individual software node does not necessarily imply that the overall copy-path processing throughput rate improves, since these threads are also used to concurrently process the image-tiles for the other software nodes contained within the image path. One can visualize this as a fixed amount of cores competing with one another to process image-tiles for each of the image processing units (such as those depicted in FIG. 1). In the case where the number of processing nodes exceeds the number of processor cores, utilizing data parallelism via SIMD intrinsic is therefore much more beneficial with respect to accelerating the copy-path's overall video throughput rate.

Figure 1:
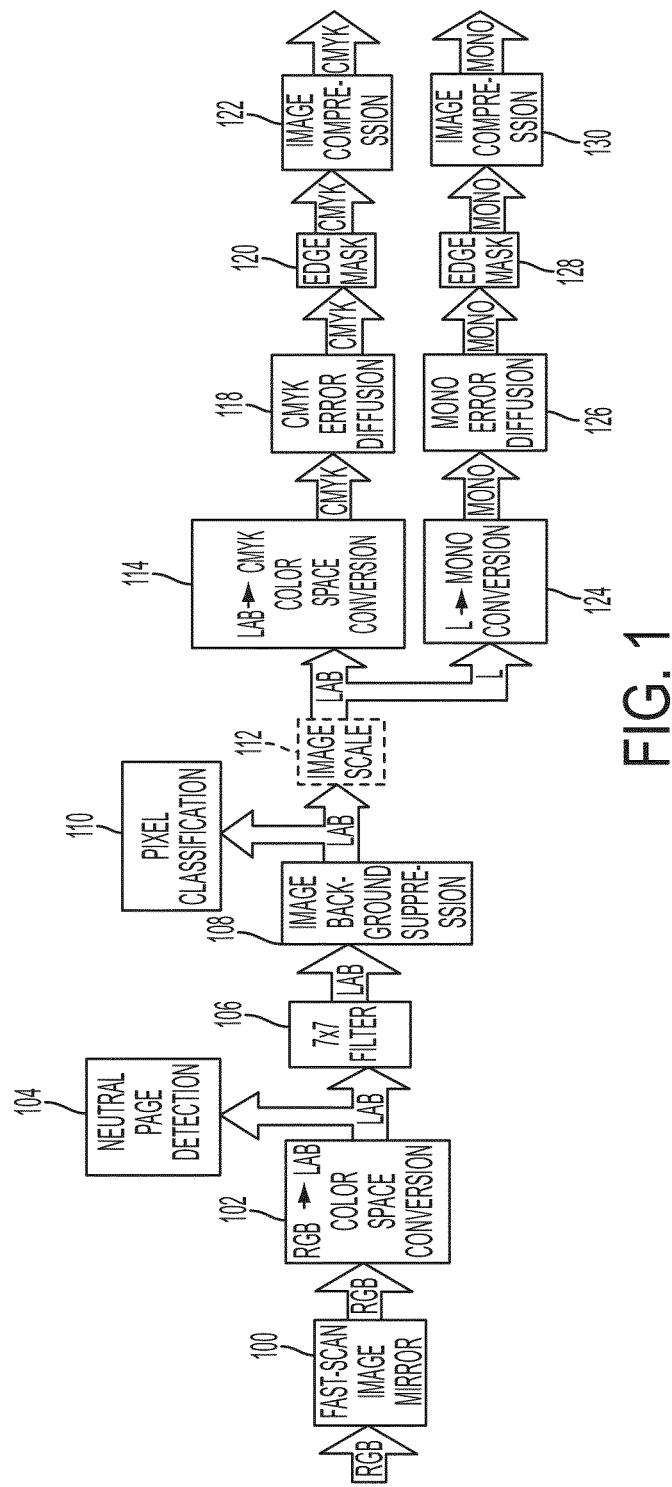
FIG. 1 is a schematic diagram illustrating image processing modules containing reduction/enlargement scaling module(s) used by systems and methods herein.

More specifically, FIG. 1 illustrates auto-color image processing nodes contained within an imaging path, such as a fast-scan image mirror 100, RGB-Lab color space conversion 102, neutral page detection 104, various filtering 106, image background suppression 108, pixel classification 110, image scaling 112 (which is discussed extensively in this disclosure), Lab-CMYK (cyan, magenta yellow, black) color space conversion 114 and corresponding Lab-mono conversion 124, CMYK error diffusion 118 and mono error diffusion 126, edge masks 120, 128, and image compression 122, 130.

SIMD instructions accelerate the video throughput rate by processing multiple amounts of data in parallel as opposed to loading and processing one operation (pixel) at a time. These parallel operations take place within dedicated "vector" registers (such as register ($R_1$-$R_3$) shown in FIG. 2, discussed below). For example, one exemplary processor that could be used in the software image path, may have a maximum vector register width of 128 bits (which can be cast to either 8-bit, 16-bit, or 32-bit concatenated signed or unsigned integer values, as desired and depending upon application).

Figure 2:
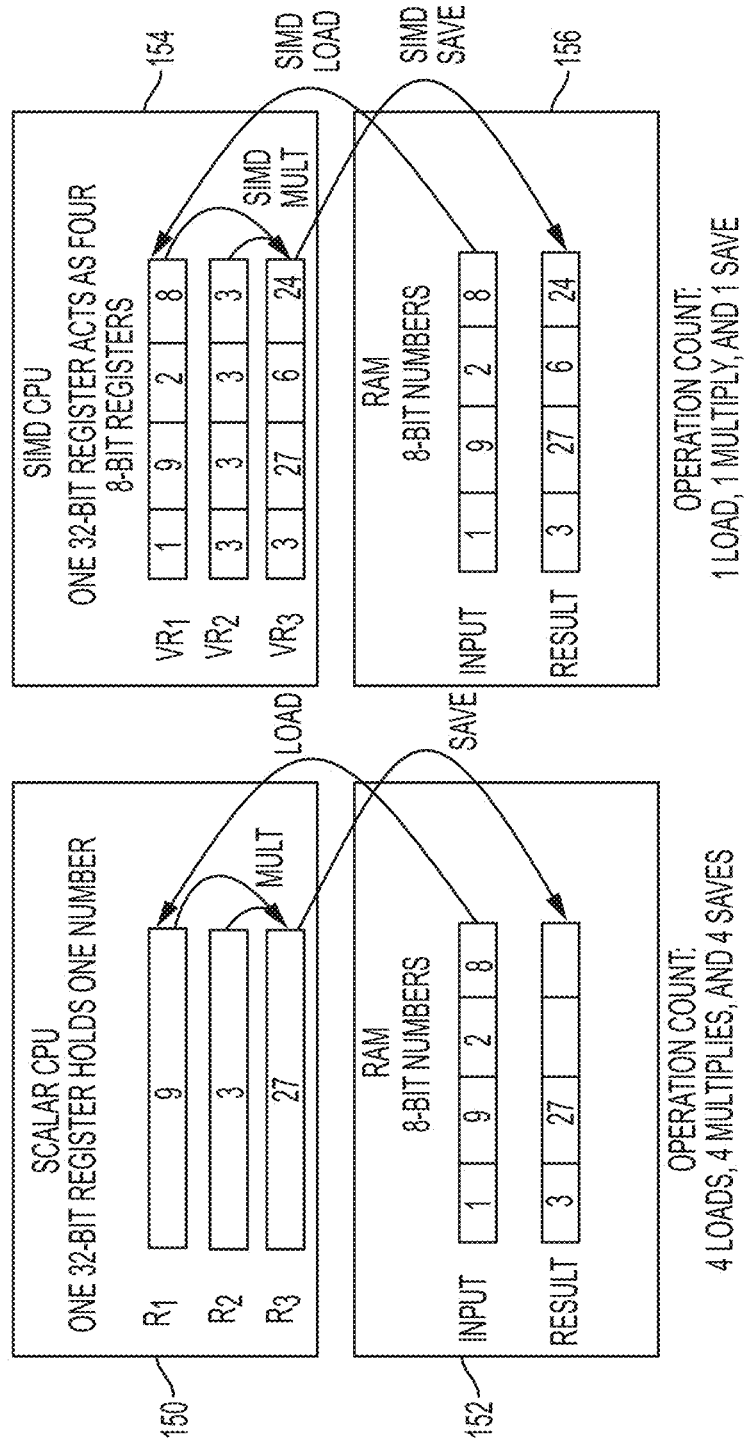
FIG. 2 is a schematic diagram illustrating the processing of several pixels at a time by systems and methods herein.

The ability to apply the same arithmetic operations in parallel is a useful mechanism for video processing acceleration. FIG. 2 is a simplified diagram that illustrates the processing of several pixels at a time between the vectorized (SIMD) approach as opposed to its scalar counterpart. More specifically, as shown by the actions between RAM (random access memory) 152 and the scalar processor (central processing unit) 150, each register ($R_1$-$R_3$) requires four loading operations, four multiplication operations, and four save operations to process four pixels. To the contrary with the SIMD processor 154 when working with RAM 156, because the registers ($vR_1$-$vR_3$) maintain data related to multiple pixels (where a 32-bit register acts as four 8-bit registers) a single load operation, a single multiply operation and a single save operation are only performed. Thus, as shown in FIG. 2, the ability to process four pixels via the SIMD operations is four times faster and uses one-quarter of the processing resources relative to scalar processing. With increases in vector register widths in the future generations of processors (128-bits→256-bits), the acceleration scales accordingly. While various sized processors, memory, registers, etc., are shown here, those skilled in the art would understand that all other types of processors, memory, registers, etc., (whether currently known or developed in the future) are useful with the systems and methods herein.

Figure 3:
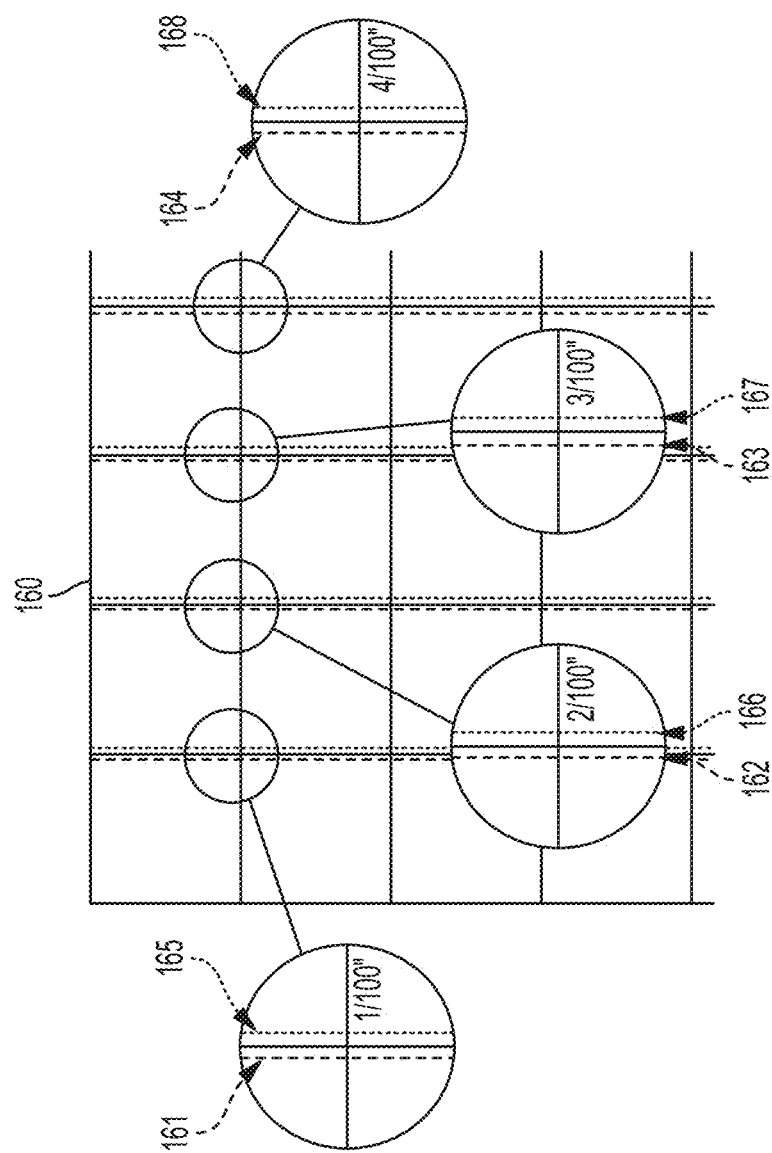
FIG. 3 is a schematic diagram illustrating one exemplary fast-scan image scaling input/output gridpoints used by systems and methods herein.

As noted above, duplex magnification compensation can consume precious processor cycles to simply apply side 1-to-side 2 scaling adjustments by as little as +/−1%, especially when every pixel in the image is subjected to magnification compensation, and this can significantly degrade overall SWIP performance. Rather than adjusting the magnification of every single pixel in the image as it is done conventionally, as noted above, the systems and methods herein selectively remove or add pixels to the image to perform the enlargement or reduction processes. For example, as shown in FIG. 3 pixels 161-164 can be removed from the native input image grid 160 or pixels 165-168 can be added to the native input image grid 160 for slight scaling adjustments of +/−1%. Thus, in this example, the dashed lines 161-164 in FIG. 3 represent pixels that are removed to provide a 1% reduction in image size, and dashed lines 165-168 represent pixels that are added to provide a 1% enlargement in image size, relative to the native input image grid 160. Therefore, in a very simplified example, if a 1% enlargement or reduction is to be made to 1000 pixel length rows, 10 pixels are being added or removed, and 1 pixel will be added or removed at a regular even spacing of every 100 pixels (1000/10=100 pixels) in the row. This is shown in FIG. 3 above, where removed pixels 161-164 are removed at pixel locations 100, 200, 300, 400, etc. across the 1000 pixel length row (as indicated by the nomenclature 1/100", 2/100", 3/100", 4/100") and where added pixels 165-168 are similarly added at pixel locations 100, 200, 300, 400, etc.

Needless to say, the output grids are very close to the native input resolution 160, and from a microscopic (localized) viewpoint, and it would (in general) be very difficult to detect video differences of this magnitude, especially given the fact that the two separate duplex scanners will inherently generate two different grayscale (frontside/backside) images. Although graphically and mathematically apparent, a 1% magnification difference on a 600 spi image corresponds to detecting a difference of 6 pixels distributed across a 1-inch region, or one pixel removed/added for every 100 pixels contained within the image. From a global standpoint, this would correspond to detecting approximately 1.5 mm distributed across one inch of output real estate. In fact, the inability to detect these small scaling differences from a localized and global standpoint is an aspect utilized by the systems and methods herein.

More specifically, the systems and methods herein take advantage of the ever-slight magnification compensation levels used to perform scaling adjustments of ~1% between side 1 and side 2 for a duplex scan, as opposed to the computationally intensive, hardware-based scaling processes that apply enlargement/reduction to every pixel in the image used conventionally. In addition, the use of SIMD intrinsics to speed-up the calculations is also a feature used in order to provide high-speed duplex magnification compensation, while at the same time minimizing the processing burden on the targeted multi-core processor.

Figure 4:
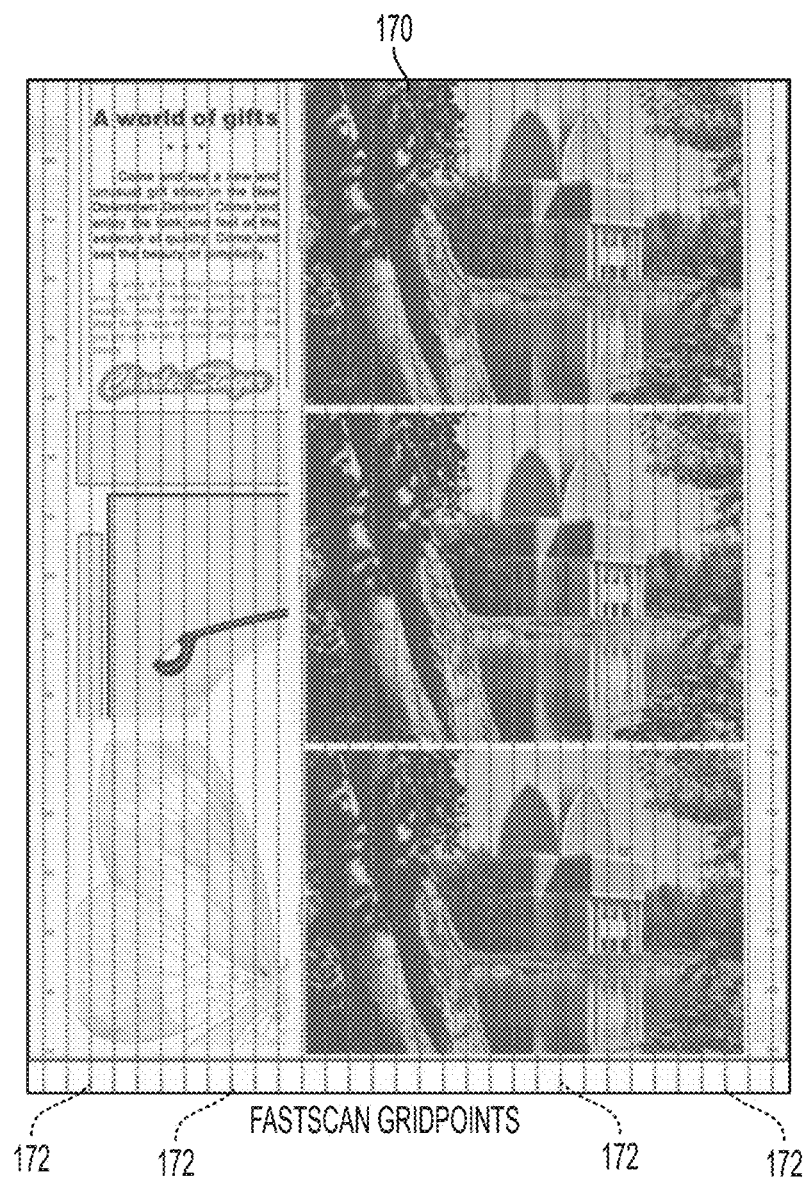
FIG. 4 is a schematic diagram illustrating fast-scan scaling gridpoints used by systems and methods herein.

One idea behind the scaling process performed by the systems and methods herein is that rather than adjusting the magnification of every single pixel in the image, the systems and methods herein determine how many pixels should be removed/added for a specific scaling factor, and evenly partition the image to either remove or add additional pixels at those specific gridpoints. FIG. 4 illustrates an example of gridpoint locations 172 superimposed on an input image 170 (for example, a 5120×6600 spi input image). In this example, the gridpoint locations 172 correspond to a fast-scan scaling factor of +/−0.625% (i.e. 99.99375% to 100.625% when subtracting or adding 32 pixels to the image, respectively). Although simply removing or adding pixels to these specific, fast-scan grid locations 172 would indeed provide an ultra-fast duplex magnification compensation software module, the resulting image-quality would not be acceptable. While various images, etc., are shown here, those skilled in the art would understand that all other types of images, etc., are useful with the systems and methods herein.

Figure 5:
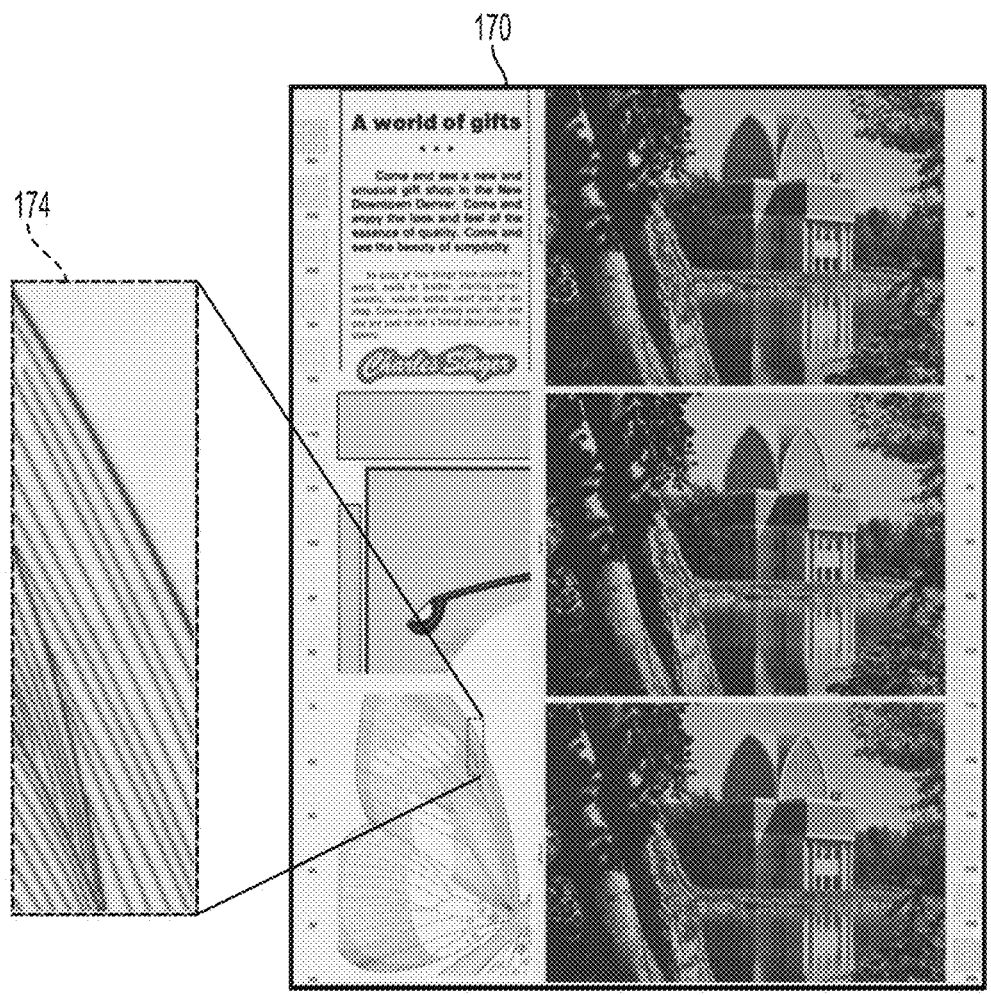
FIG. 5 is a schematic diagram illustrating a butterfly thin-line object used by systems and methods herein for image quality evaluation.

FIG. 5 illustrates a section of the "butterfly wing" 174 shown in FIG. 4, and this section will be used to show how the Systems and methods herein maintain image quality even while removing or adding pixels. The butterfly object 174 is useful since its thinline structure and topography tend to highlight subtle artifacts that may arise from inserting and/or removing pixels to perform the small scaling adjustments that are used to achieving high-speed throughput rates.

Figure 6:
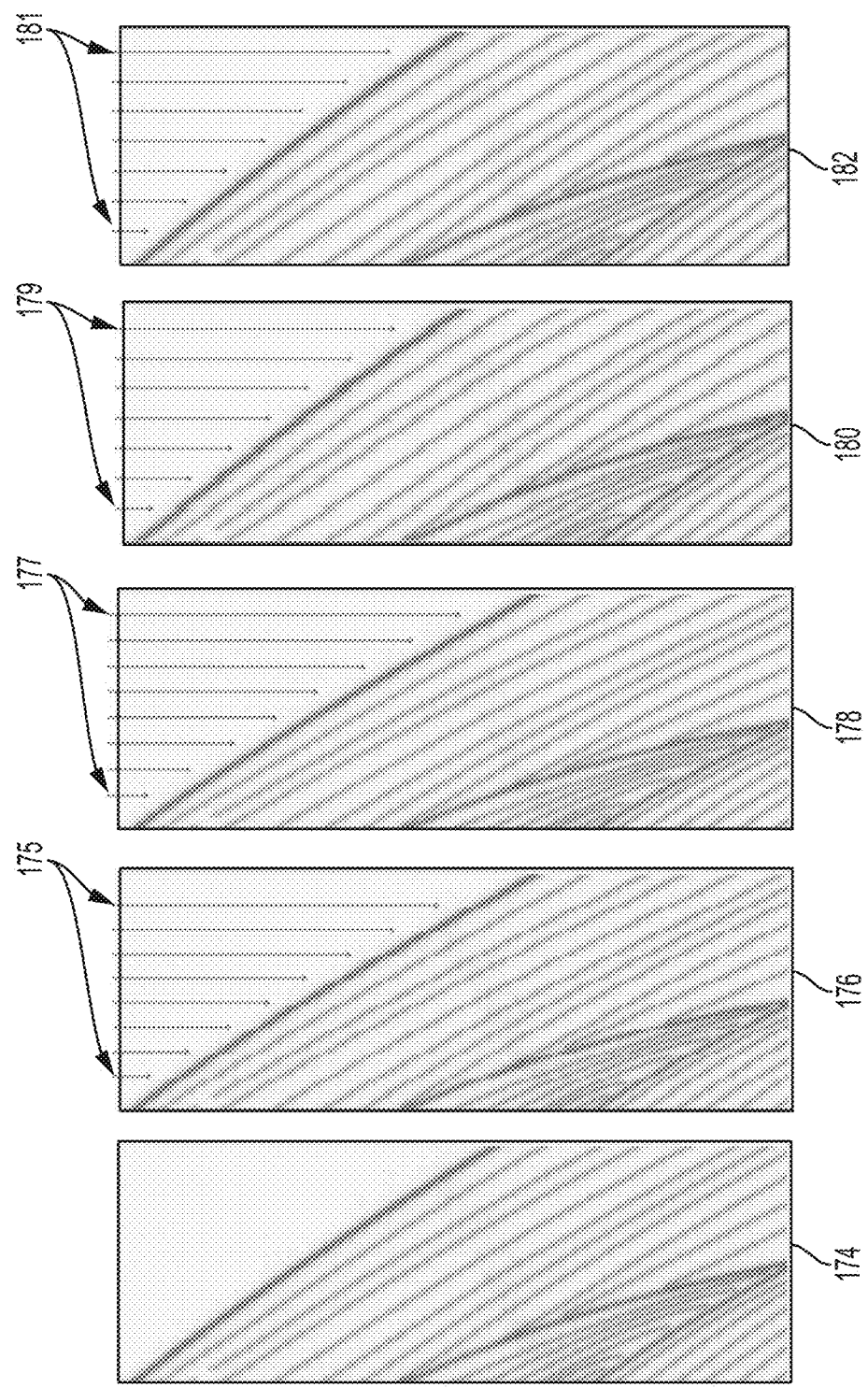
FIG. 6 is a schematic diagram illustrating output images generated by systems and methods herein.

FIG. 6 illustrates the same portion of the butterfly object 174 found in the input image 170 shown in FIGS. 4 and 5. FIG. 6 also illustrates the result of the systems and methods herein reducing the size of the image 170 by removing pixels in item 176. In item 176, the locations of the removed pixels produce artifacts that are indicated by arrows 175. In order to address the artifacts 175, the systems and methods herein remove the pixels in a weighted smoothing process to eliminate artifacts 175. After the weighted smoothing process (as shown in item 178, where the location of the removed pixels are indicated by arrows 177) the previously shown artifacts 175 are not visible. The systems and methods herein can also enlarge the size of the image 170 by adding pixels in item 180. In item 180, the locations of the added pixels produce artifacts that are indicated by arrows 179. In order to address the artifacts 179, the systems and methods herein perform the pixel addition in a weighted smoothing process to eliminate artifacts 179. After the weighted smoothing process (as shown in item 182, where the location of the added pixels are indicated by arrows 181) the previously shown artifacts 179 are not visible. As can be seen by comparing items 174, 178, and 182 in FIG. 6, the systems and methods herein produce very high quality results, while at the same time substantially decrease processing time, and decrease resource utilization of the processor, thereby freeing the resources used by the processor to perform other activities and increasing the performance and functionality of the processor.

The attributes of the latest SIMD intrinsics available within multi-core processors are ideally suited to produce both high quality results and decrease processing time. Specifically, with systems and methods herein, interpolated video calculations are distributed over several fast-scan pixels, while at the same time benefiting from the high-speed processing rates achieved via data parallelism (also known as vectorization). For the processor discussed in the examples herein, the vector width is 128-bits, which can be cast to eight, 16 bits per pixel (bpp) signed integer values. Because this exemplary processor has these exemplary sized registers, the examples provided herein process, eight pixels at a time via SIMD intrinsics; however, the systems and methods herein can be used with any size registers (whether currently known or developed in the future) and those ordinarily skilled in the art would understand that the simultaneous processing performed on the eight pixels described herein could be performed on any set of pixels (4, 8, 16, 32, etc.) and that the claims presented below are not limited to the specific examples used in this disclosure. Thus, while various processors and specific width vectors, etc., are discuss here, those skilled in the art would understand that other processors, other width vectors, other dimensioned vectors, etc., are useful with the systems and methods herein.

Figure 7:
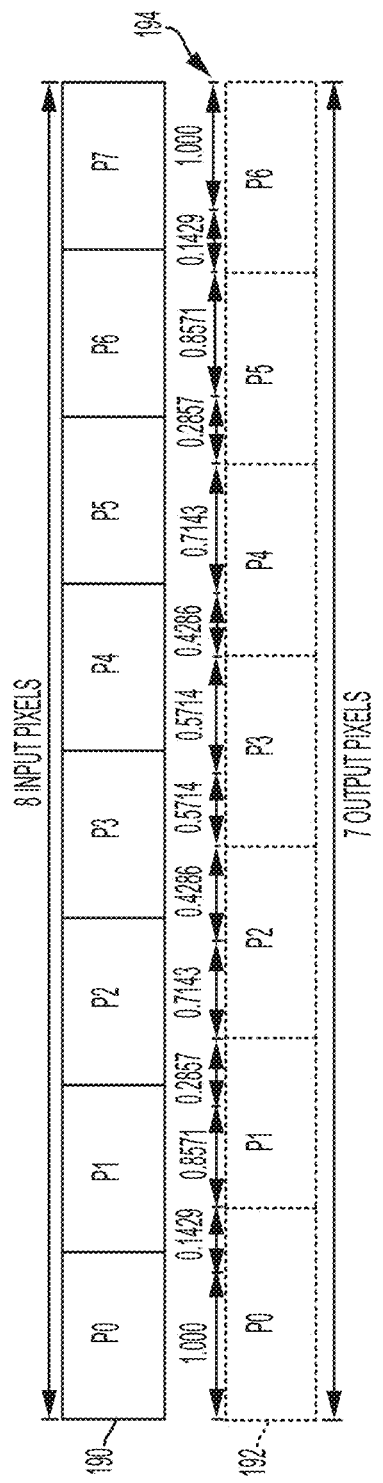
FIG. 7 is a schematic diagram illustrating vector video pixel distribution for reduction used by systems and methods herein.

FIG. 7 illustrates video distribution across eight (P0-P7) input pixels (in register 190) that are to generate seven (P0-P6) output pixels (in register 192) for reduction scaling purposes. In essence, the creation of seven output pixels from eight input pixels distributes the scaling calculations across several pixels, thereby minimizing the spatial rate at which the video is modified within the rendered output image. The result of this scaling technique is superior image quality.

In FIG. 7, various weighting percentages are listed between the representations of the registers 190, 192, as identified by reference number 194. The systems and methods herein generate each of the pixels in the output, lower pixel-count, and reduced size image register 192 by utilizing weighted percentages of data from multiple pixels in input, higher pixel-count, original image size register 190. In this example because only a single pixel of an eight pixel register is being removed, each of the pixels that is generated for the output register 192 only utilizes weighted percentages of data from two corresponding, adjacent pixels from the input image register 190; however, this could change depending upon the number of pixels that are removed in the image reduction process, as well as the number of pixels and that can be maintained within each register. Therefore, in the example shown in FIG. 7, pixel P0 in register 192 is generated using weighted data from corresponding (adjacent) pixels P0 and P1 in register 190; pixel P1 in register 192 is generated using weighted data from corresponding (adjacent) pixels P1 and P2 in register 190; pixel P2 in register 192 is generated using weighted data from corresponding (adjacent) pixels P2 and P3 in register 190; etc.

For example, equal percentages of two input pixels (P3 and P4 in 190) are used to generate the corresponding output pixel (P3 in 192) near the center of the eight-pixel vector register 190 (i.e., output pixel P3 in 192 is generated using data contributions of input pixels P3 and P4 in 190, with a weighting factor of 0.5714 each). However, the weighting factors increase to unity at the outward pixels P0 and P6 in 192, corresponding to input pixels P0 and P7 in 190, respectively. More specifically, as shown in FIG. 7, pixel P1 in register 192 uses a weighting percentage 1.000 of the data from pixel P0 in 190, and a weighting percentage 0.1429 of the data from pixel P1 in 190.

Continuing on with the example shown in FIG. 7, the systems and methods herein generate the seven reduction scaled video output pixels P0-P6 in register 192 from the eight input pixels P0-P7 by performing the following calculations:

$$P0 = ((1.0000)*(P0) + (0.1429)*(P1))*(0.8750) \qquad 1.$$

$$P1 = ((0.8571)*(P1) + (0.2857)*(P2))*(0.8750) \qquad 2.$$

$$P2 = ((0.7143)*(P2) + (0.4286)*(P3))*(0.8750) \qquad 3.$$

$$P3 = ((0.5714)*(P3) + (0.5714)*(P4))*(0.8750) \qquad 4.$$

$$P4=((0.4286)*(P4)+(0.7143)*(P5))*(0.8750) \quad 5.$$

$$P5=((0.2857)*(P5)+(0.8571)*(P6))*(0.8750) \quad 6.$$

$$P6=((0.1429)*(P6)+(1.0000)*(P7))*(0.8750) \quad 7.$$

Note that the "normalization" factor of 0.8750 corresponds to the actual scaling factor of 87.5% with a seed factor of 1.0/0.8750=1.1429. In other words, the actual scaling calculations that are performed within the 8-pixel image swath(s) are the same as applying an 87.5% reduction when utilizing perspective projection. As previously mentioned, the actual scaling factor is used in conjunction with distributing the calculations across several pixels in order to achieve the high image-quality output desired.

Figure 8:
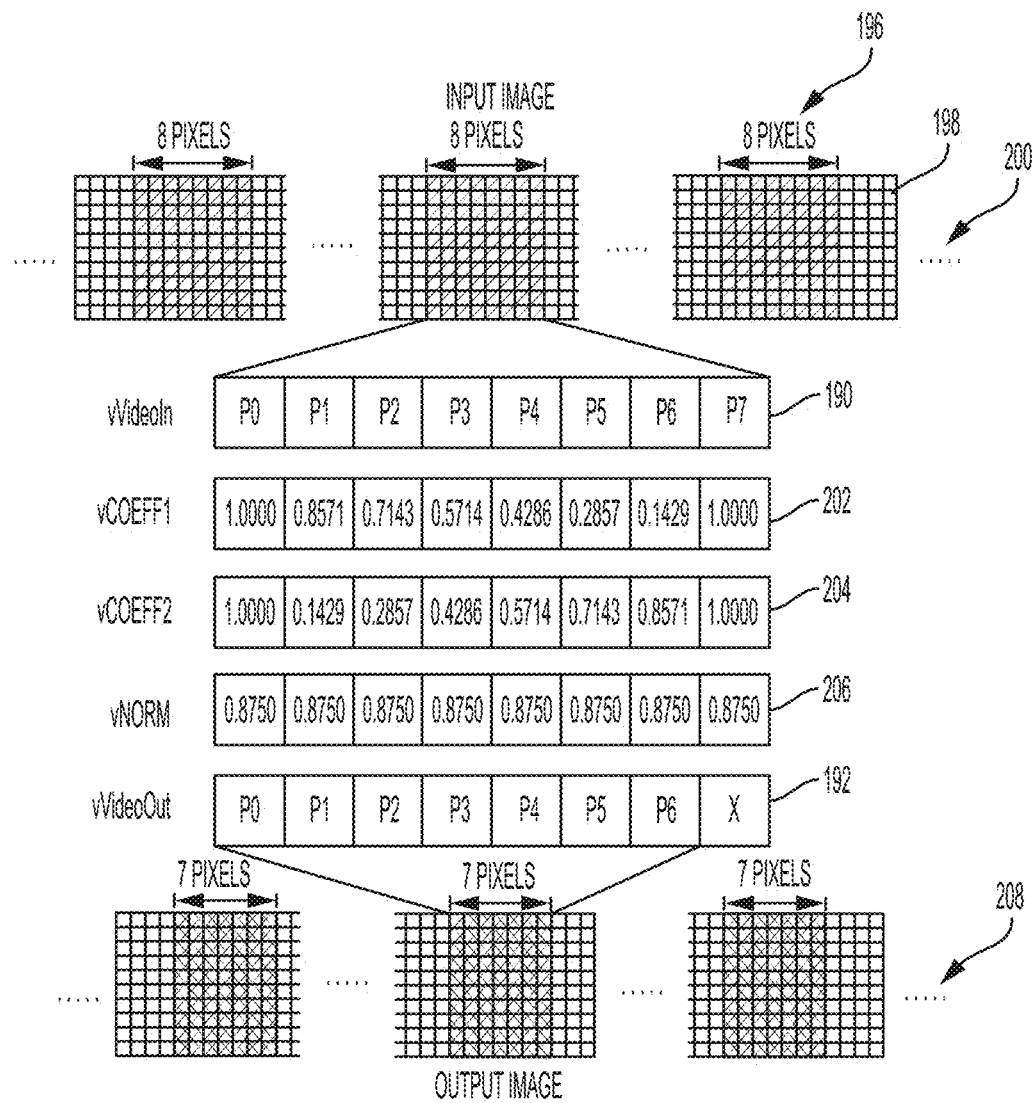
FIG. 8 is a schematic diagram illustrating vector register processes for reduction scaling by systems and methods herein.

Continuing with the size reduction example shown in FIG. 7, FIG. 8 illustrates the exemplary SIMD vector registers (190, 192, 202, 204, and 206) used to perform the scaling operations for high-speed reduction of a scanline 196 of an input image 200 to produce an output image 208. The scanline is within a "swath" of 8-pixel regions 196, with each region 196 located at evenly distributed gridpoints 198 along a fast-scan image axis of the input image 200. The fast-scanned image axis is a processing direction across the input image 200 and is in the direction of the double-headed arrows shown in FIG. 8.

More specifically, the vector registers illustrated in FIG. 8 include the vector register 190 (discussed above in FIG. 7) maintaining the data of pixels of the input image (vVideoIn); a vector register 202 maintaining the weighting percentages of a first corresponding input pixel that will contribute to an output pixel (vCoeff1); another vector register 204 maintaining the weighting percentages of the other corresponding input pixel that will contribute to an output pixel (vCoeff2); a vector register 206 maintaining the normalization factor that corresponds to the scaling factor (vNorm); and the register 192 (discussed above in FIG. 7) that maintains the data of pixels of the output image (vVideoOut). The scaling coefficients (vCoeff1, vCoeff, and vNorm) are predetermined based on the normalization factor and the number of pixels involved, and can be calculated and loaded within the vector registers at the beginning of each tile, thereby further speeding the processing. As noted in FIG. 7, each output pixel in register 192 is based on weighted data from multiple input pixels (in this case two input pixels) from register 190. In this weighting process, each output pixel calculation looks to the weighting percentage shown in the first weighting register 202 for the first corresponding pixel of the input image, and each output pixel calculation also looks to the weighting percentage shown in the second weighting register 204 for the second corresponding pixel. Therefore, as noted above, pixel P1 in register 192 uses a weighting percentage 1.000 (from register 202) for the data from pixel P0 in register 190, and a weighting percentage 0.1429 (from register 204) for the data from pixel P1 in register 190. Therefore, the systems and methods herein can, in one example, multiply the data within the two corresponding input pixels by the weighting percentages to produce two outputs, sum the two outputs to produce a result, and then multiply the result by the normalization factor to result in the value of the output pixel (shown and register 192); although those ordinarily skilled in the art would understand that many other types of weighting processes could be utilized.

Therefore, as shown in FIG. 8, in this example to generate the scaled video output pixels 192 from the eight input pixels 190 via SIMD vectorization, the following processes are performed:

$$vTmp1=vVideoIn*v\,Coeff1; \quad 1.$$

← Multiply the input video vector by the coefficient1 vector and store in a temporary vector (vTmp1).

$$vTmp2=vVideoIn*v\,Coeff2; \quad 2.$$

← Multiply the input video vector by the coefficient2 vector and store in a temporary vector (vTmp2).

$$vTmp2=(vTmp2<<16); \quad 3.$$

← Shift the 128-bit vector to the left by 16-bits while shifting in 0's.

$$vTmp1=vTmp1+vTmp2; \quad 4.$$

← Add the two temporary vectors (vTmp1 to vTmp2).

$$vVideoOut=vTmp1*vNorm; \quad 5.$$

← Multiply the vector vTmp1 by the normalization vector (vNorm) and store the 8-pixel vector to the output 192.

$$pVideoOut+=7; \quad 6.$$

← Increment the output pointer by 7 bytes.

As illustrated above, the number of SIMD vector operations to generate seven output pixels is small compared with those required via the traditional perspective projection where potentially all pixels in an image are processed. Continuing with the previous very simplified example, conventional processes that perform 1% enlargement/reduction of every single pixel in a 1000 pixel length row would perform 1000 calculations. To the contrary, for the same enlargement/reduction of the same size row, with the systems and methods herein 10 pixels would be added/removed, resulting in 10 sets of 8 pixels (80 pixels total) being processed by the systems and methods herein (and the sets of eight pixels would all be processed in parallel (simultaneously)); resulting in a speed increase in the approximate range of 10 X-100 X. Those ordinarily skilled in the art would understand that this it is a dramatically oversimplified example, and that there are many other factors that affect the consideration of the speed increase, and such would increase or decrease the foregoing result.

Further, the systems and methods herein eliminate the need to transpose the input image in order to load the vector registers with pixel data in the correct format, thereby accelerating the video processing even further. Lastly, the scaling coefficients (vCoeff1, vCoeff, and vNorm) are predetermined and can be calculated and loaded within the vector registers at the beginning of each tile, thereby further speeding the processing.

Figure 9:
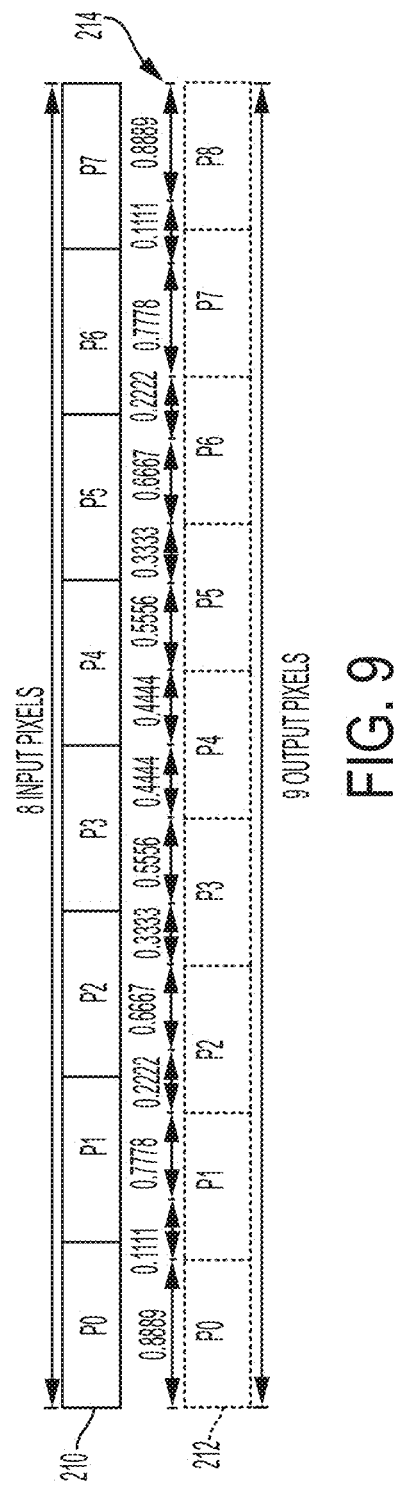
FIG. 9 is a schematic diagram illustrating vector video pixel distribution for enlargement used by systems and methods herein.

FIG. 9 is similar to FIG. 7 and illustrates the video distribution across eight input pixels in register 210 used to generate nine output pixels in register 212, but this time for enlargement scaling purposes. As was done in FIG. 7, in FIG. 9, various weighting percentages are listed between the representations of the registers 210, 212, as identified by reference number 214.

In FIG. 9, as was done in FIG. 7, various weighting percentages are listed between the representations of the registers 210, 212, as identified by reference number 214. The systems and methods herein generate each of the pixels in the output, higher pixel-count, enlarged image register 212 by utilizing weighted percentages of data from multiple pixels in input, lower pixel-count, original image size register 210. In this example because only a single pixel of an eight pixel register is being added, each of the pixels that is generated for the output register 212 only utilizes weighted percentages of data from two corresponding, adjacent pixels from the input image register 210. However, this could change depending upon the number of pixels that are added in the image reduction process, as well as the number of pixels and that can be maintained within each register. Therefore, in the example shown in FIG. 9, pixel P0 in register 212 is generated using weighted data from corresponding (adjacent) pixels P0 and P1 in register 210; pixel P1 in register 212 is generated using weighted data from corresponding (adjacent) pixels P1 and P2 in register 210; pixel P2 in register 212 is generated using weighted data from corresponding (adjacent) pixels P2 and P3 in register 210; etc.

Note that, again, equal percentages of two input pixels are used to generate the corresponding output pixel near the center of the eight-pixel vector register 212 (i.e. output pixel P4 in register 212 using contributions of input pixels P3 and P4 in register 210 with a weighting factor of 0.4444 each). The weighting factors increase to 0.8889 at the outward pixels P0 and P8 in register 212 corresponding to input pixels P0 and P7 in register 210, respectively, and take a lower percentage of their respective neighbor pixels (0.1111), P1 and P6.

Once again, the creation of nine output pixels from eight input pixels distributes the scaling calculations across several pixels, thereby minimizing the spatial rate at which the video is modified within the output image. The rendered output is very similar to that generated via the traditional linear scaling process that is typically used for image enlargement purposes.

As shown in FIG. 9 in order to generate the nine scaled video output pixels P0-P8 from the eight input pixels P0-P7, the following processes are performed:

$$P0=((0.8889)*(P0))*(1.1250)=P0 \qquad 1.$$

$$P1=((0.1111)*(P0)+(0.7778)*(P1))*(1.1250) \qquad 2.$$

$$P2=((0.2222)*(P1)+(0.6667)*(P2))*(1.1250) \qquad 3.$$

$$P3=((0.3333)*(P2)+(0.5556)*(P3))*(1.1250) \qquad 4.$$

$$P4=((0.4444)*(P3)+(0.4444)*(P4))*(1.1250) \qquad 5.$$

$$P5=((0.5556)*(P4)+(0.3333)*(P5))*(1.1250) \qquad 6.$$

$$P6=((0.6667)*(P5)+(0.2222)*(P6))*(1.1250) \qquad 7.$$

$$P7=((0.7778)*(P6)+(0.1111)*(P7))*(1.1250) \qquad 8.$$

$$P8=((0.8889)*(P7))*(1.1250)=P7 \qquad 9.$$

Note that the "normalization" factor of 1.1250 corresponds to the actual scaling factor of 112.5% with a seed factor of 1.0/1.1250=0.8889. In other words, the actual scaling calculations that are performed within the eight-pixel image swath(s) are the same as applying a 112.5% enlargement when utilizing linear interpolation. As previously mentioned, the actual scaling factor is less important than distributing the calculations across several pixels in order to achieve the high image-quality output desired.

Figure 10:
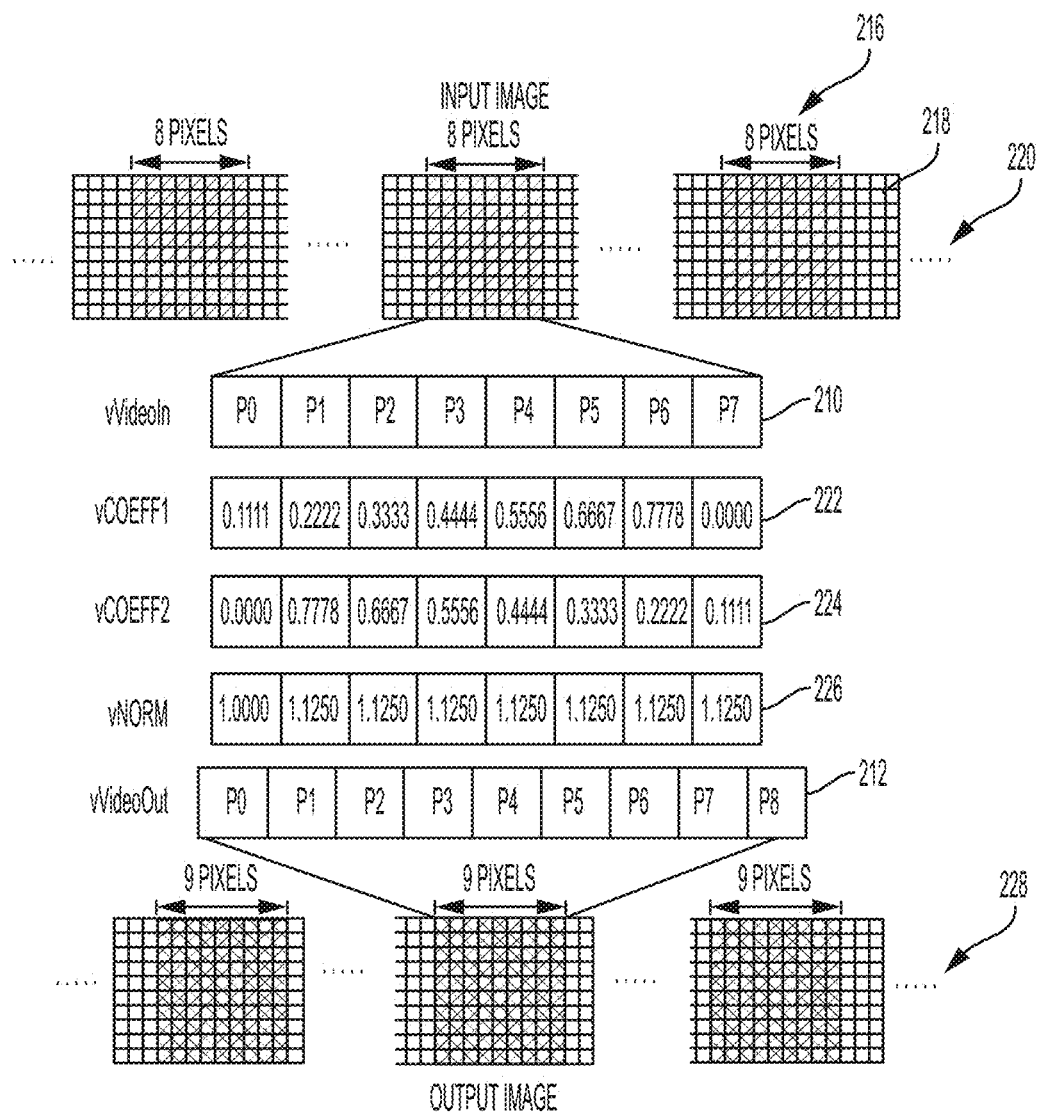
FIG. 10 is a schematic diagram illustrating vector register processes for enlargement scaling by systems and methods herein.

Following with the example in FIG. 9, FIG. 10 illustrates enlargement of an input image 220 having fewer pixels into an output image 228 having a relatively larger number of pixels. The vector registers illustrated in FIG. 10 include the vector register 210 (discussed above in FIG. 9) maintaining the data of pixels of the input image (vVideoIn); a vector register 222 maintaining the weighting percentages of a first corresponding input pixel that will contribute to an output pixel (vCoeff1); another vector register 224 maintaining the weighting percentages of the other corresponding input pixel that will contribute to an output pixel (vCoeff2); a vector register 226 maintaining the normalization factor that corresponds to the scaling factor (vNorm); and the register 212 (discussed above in FIG. 9) that maintains the data of pixels of the output image (vVideoOut). The scaling coefficients (vCoeff1, vCoeff, and vNorm) are predetermined based on the normalization factor and the number of pixels involved, and can be calculated and loaded within the vector registers at the beginning of each tile, thereby further speeding the processing. As noted in FIG. 9, each output pixel in register 212 is based on weighted data from multiple input pixels (in this case two input pixels) from register 210. In this weighting process, each output pixel calculation looks to the weighting percentage shown in the first weighting register 222 for the first corresponding pixel of the input image, and each output pixel calculation also looks to the weighting percentage shown in the second weighting register 224 for the second corresponding pixel. Therefore, as noted above, pixel P1 in register 212 uses a weighting percentage 0.1111 (from register 222) for the data from pixel P0 in register 210, and a weighting percentage 0.7778 (from register 224) for the data from pixel P1 in register 210. Therefore, the systems and methods herein and multiply the data within the two corresponding input pixels by the weighting percentages to produce two outputs, sum the two outputs to produce a result, and then multiply the result by the normalization factor to result in the value of the output pixel (shown and register 212).

Thus, in a similar manner to that discussed with respect to FIG. 8 above, FIG. 10 illustrates the SIMD vector registers used to perform the scaling operations for high-speed image enlargement. In order to generate the scaled video output pixels from the eight input pixels via SIMD vectorization, the following calculations are performed:

$$vTmp1 = vVideoIn * vCoeff1; \qquad 1.$$

← Multiply the input video vector by the coefficient1 vector and store in a temporary vector (vTmp1).

$$vTmp2 = vVideoIn * vCoeff2; \qquad 2.$$

← Multiply the input video vector by the coefficient2 vector and store in a temporary vector (vTmp2).

$$vTmp1 = (vTmp1 >> 16); \qquad 3.$$

← Shift the 128-bit vTmp1 vector to the right by 16-bits while shifting in 0's.

$$vTmp1 = vTmp1 + vTmp2; \qquad 4.$$

← Add the 2 temporary vectors (vTmp1 to vTmp2).

$$vTmp1 = Mux[vVideoIn[127:120], vTmp1]; \qquad 5.$$

← Mux the original input video P0 within the upper vTmp1 vector location.

$$vVideoOut = vTmp1 * vNorm; \qquad 6.$$

← Multiply the vector vTmp1 by the normalization vector (vNorm) and store the 8-pixel vector to the output.

$$pVideoOut += 8; \qquad 7.$$

← Increment the output pointer by 8 bytes.

$$vVideoOut = (vVideoIn << 120); \qquad 8.$$

← Shift the 128-bit vector to the left by 120-bits while shifting in 0' and store the 8-pixel vector.

$$pVideoOut += 1; \qquad 9.$$

← Increment the output pointer by 1 byte.

As illustrated above, the number of SIMD vector operations to generate nine output pixels is small compared with those required via the traditional linear interpolation process, where each pixel contained within the input image is processed, as opposed to those contained within the selected gridpoints. Specifically, only 9 vector operations are used to process the eight-pixel example presented above. As in the reduction scenario, the scaling coefficients (vCoeff1, vCoeff, and vNorm) are predetermined and can be calculated and loaded within the vector registers at the beginning of each tile in order to increase processing speed.

While some specific register sizes and vector widths are discussed above, those ordinarily skilled in the art would readily understand that the systems and methods herein can exploit future vector register extensions in order to offer higher video processing throughput rates. In this case, the ability to distribute the scaling calculation over a wider swath of pixels improves the resulting image quality while still maintain the desired throughput rate.

Additionally, while the foregoing examples have been presented with regard to duplex magnification compensation (DMC), those ordinarily skilled in the art would understand that the systems and methods are applicable to any form of image enlargement or image size reduction. Therefore while DMC is utilized as an example in the previous discussion, the claims presented below are not intended to be limited to any of the examples used to illustrate the concepts of systems and methods herein. Thus, these systems and methods have broader applications beyond duplex magnification compensation and are applicable to all magnification adjustments (any enlargement/reduction processing). The image-quality of using this technique is sufficient for scan/copy jobs within almost any scaling ranges, while at the same time significantly increasing the system-level throughput. For example, the systems and methods herein can also be utilized to accelerate the image processing throughput rate in the multi-media handheld devices market.

Figure 11:
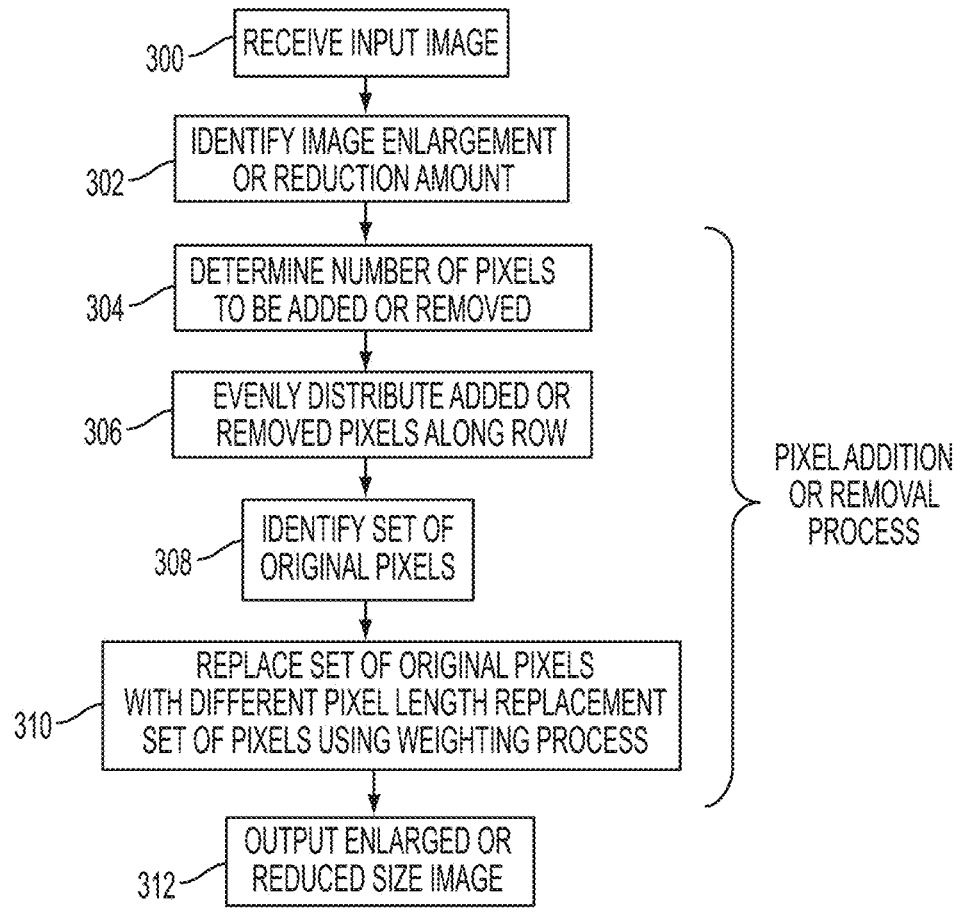
FIG. 11 is a flow diagram of various methods herein.

FIG. 11 is flowchart illustrating exemplary methods herein. In item 300, these methods receive, into an image processor, an input image made up of original image pixels, arranged in parallel rows of pixels and parallel columns of pixels. The rows of pixels are perpendicular to the columns of pixels (see FIG. 6) and the terms "rows" and "columns" are used interchangeably herein as the distinction between the two is dependent only upon the orientation of the image. Also, these methods identify the amount of image enlargement or image reduction that is to be performed on the input image (potentially using the image processor) and this amount of image enlargement or image reduction can be manually input or automatically determined in item 302 (e.g., by automatically comparing first and second sheet sides of a duplex scanned image).

Rather than adjusting the magnification of every single pixel in the image, these methods add or remove pixels to or from the original image to perform the image enlargement or image reduction, as shown by items 304-310 in FIG. 11. Thus, in item 304, these methods determine the number of pixels that are to be added or removed within each of the rows of pixels to accomplish the identified amount of image enlargement or image reduction (using the image processor). Note that while the examples herein discuss processing rows of pixels, those ordinarily skilled in the art would understand that the processing would be equally effective in the perpendicular direction, processing the columns. Therefore, row processing or column processing in this disclosure is considered equivalent, and all references herein to a row could equally be made to a column.

More specifically, the process of determining the number of pixels to be added or removed within each of the rows of pixels in item 304 can be performed by multiplying the amount of image enlargement or image reduction (in the form of a percentage) by the total number of pixels within each of the rows of pixels. For example, if each of the rows of pixels is 1000 pixels in length, and a 1% enlargement or reduction is to be performed, 10 pixels (1000 pixels×1%=10 pixels) would be added to or removed from that row of pixels.

In item 306, these methods evenly distribute the pixels that are to be added or removed along the full length of each of the rows of pixels, so as to position the pixels to be added or removed at regular, equal intervals along the full length of each of the rows of pixels (using the image processor). To evenly distribute the pixels in the rows in item 304, the methods herein divide the total number of pixels within each of the rows by the number of pixels that are to be added or removed, and the resulting value from that division process indicates the regular, equal pixel spacing between added/removed pixels. Continuing with the foregoing example of a 1% enlargement or reduction of 1000 pixel length rows, because 10 pixels are being added or removed, 1 pixel will be added or removed every 100 pixels (1000/10=100 pixels) in the row; and this is shown in FIG. 3 above, where removed pixels 161-164 are removed at pixel locations 100, 200, 300, 400, etc., and where added pixels 165-168 are similarly added at pixel locations 100, 200, 300, 400, etc.

In item 308, rather than just removing some pixels from the image, in order to maintain image quality, these methods add or remove pixels in a process that eliminates artifacts that are created by the additional or missing pixels, such as the artifacts 175 and 179 shown in items 176 and 180 in FIG. 6. Specifically, for each pixel that is to be added or removed, the methods identify a set of original pixels that are in the same row as, and immediately adjacent to, each pixel that is to be added or removed. For example, as shown in FIGS. 8 and 10, discussed above, the set of original pixels that is identified is 8 pixels long, as shown in registers 190 and 210. While the systems and methods herein are most efficient when the number of pixels that are processed (including pixels that are added or removed, and the surrounding pixels in the sets of original pixels) is a relatively small percentage of the overall pixels within the image (e.g., less than 2%, 5%, 10%, 20%, etc., of all the pixels in the image); processing speed and resource utilization is still improved with the systems and methods herein even if larger numbers of pixels are processed, while at the same time not substantially affecting image quality.

This process of identifying the set of original pixels 308 positions the location of the each pixel that is to be added or removed at the approximate center of the set of original pixels, along the corresponding row of pixels. For example, as shown in FIG. 7, discussed above, either of the original pixels P3 or P4 in register 190 is the pixel that is removed in register 192, or such a pixel location is at the approximate center of the set of original pixels 190. Similarly, as shown in FIG. 9, discussed above, an additional pixel is added between the original pixels P3 and P4 in register 210 to result in the pixels shown in register 212, and such an added pixel (pixel P4 in register 212) is added at the approximate center of the set of original pixels 210.

In the adding/removing process, these methods replace the set of original pixels with a different pixel length replacement set of pixels using a weighting process, as shown by item 310 in FIG. 11. More specifically, these methods replace each set of original pixels (e.g., in registers 190 and 210 in FIGS. 7 and 9) with a replacement set of pixels (e.g., in registers 192 and 212 in FIGS. 7 and 9) and the replacement set of pixels has a different pixel length (e.g., 7 or 9 pixels) relative to the pixel length of the set of original pixels (e.g., 8 pixels). As shown in registers 192 and 212 in FIGS. 7 and 9, each replacement set of pixels has one less pixel (e.g., P0-P6) or one more pixel (e.g., P0-P8) relative to the set of original pixels (e.g., P0-P7) based on whether image enlargement or image reduction is to be performed on the image. Further, each of the replacement pixels (in a corresponding replacement set of pixels) has a different data value relative to a corresponding original pixel (in a corresponding one of the sets of original pixels) because of the weighting process.

Thus, as part of replacing the set of original pixels with the replacement set in item 310, these methods determine data values for replacement pixels in each of the replacement sets by weighting data values from original pixels in the set of original pixels. These original pixels from the set of original pixels that are used in the weighting process can include a first pixel within the set of original pixels that has the same corresponding position as the replacement pixel, and another pixel within the set of original pixels that is adjacent to the first pixel. This is shown, for example, in the discussion of FIG. 7 presented above where it is explained that the data within pixel P0 in register 192 is based upon a full weighting of the data within pixel P0 in register 190 and a partial weighting of the data within pixel P1 in register 190. Similarly, this is shown, for example, in the discussion of FIG. 9 presented above where it is explained that the data within pixel P1 in register 212 is based upon a partial weighting of the data within pixel P0 in register 210 and a partial weighting of the data within pixel P1 in register 210. Further, a pixel within the set of original pixels is considered to have the same corresponding position as a replacement pixel when they have the same pixel number (e.g., P4) in both sets. Therefore, for example, pixel P4 in register 210 would be considered to correspond to pixel P4 in register 212 in FIG. 9.

The weighting amounts are based on the amount of image enlargement or image reduction that is to be performed on the input image, and on the number of pixels in the replacement set of pixels (e.g., see weighting values 194, 202, 204, 214, 222, and 224 shown in FIGS. 7-10, discussed above). After completing the process of adding or removing the pixels, these methods output an enlarged or reduced size version of the input image from the image processor, as shown in item 312.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by human alone (or one operating with a pen and a pad of paper) and instead such processes can only be performed by a machine because the processes involved image data contained within pixels which is data that is only stored electronically, a not data that can be manipulated by humans working with a pen and pad of paper. Specifically, processes such as processing digital images, electronic transmission of data over networks, etc., requires the utilization of different specialized machines.

Further, such machine-only processes are not mere "post-solution activity" because the information being processed is image values obtained and output electronically. Similarly, the electronic transmissions internal to the machine and external utilize special-purpose equipment (optical scanners, image processors, telecommunications equipment, routers, switches, etc.) that are distinct from a general-purpose processor. Also, the manipulation of pixels for image magnification/reduction is integral with the process performed by the methods herein, and is not mere post-solution activity, because one focus of the discussion presented above is to change the magnification of an electronic image using image processing devices. In other words, these various machines are integral with the methods herein because the methods cannot be performed without the machines (and cannot be performed by humans alone).

Additionally, the methods herein solve many highly complex technological problems. For example, as mentioned above image reduction/magnification processes utilize substantial processing resources (including computing resources and storage resources). Methods herein solve this technological problem by avoiding the need for image processing devices to process data of all the pixels within an image; and, instead, systems and methods herein call on the processor and associated peripheral resources to only process a fraction of all the pixels within an image. This reduces the amount of electronic storage that a device maintains, and also reduces the technological resources used. By granting such benefits, the systems and methods herein reduce the amount and complexity of hardware and software used to be purchased, installed, and maintained, thereby solving a substantial technological problem that providers experience today.

Figure 12:
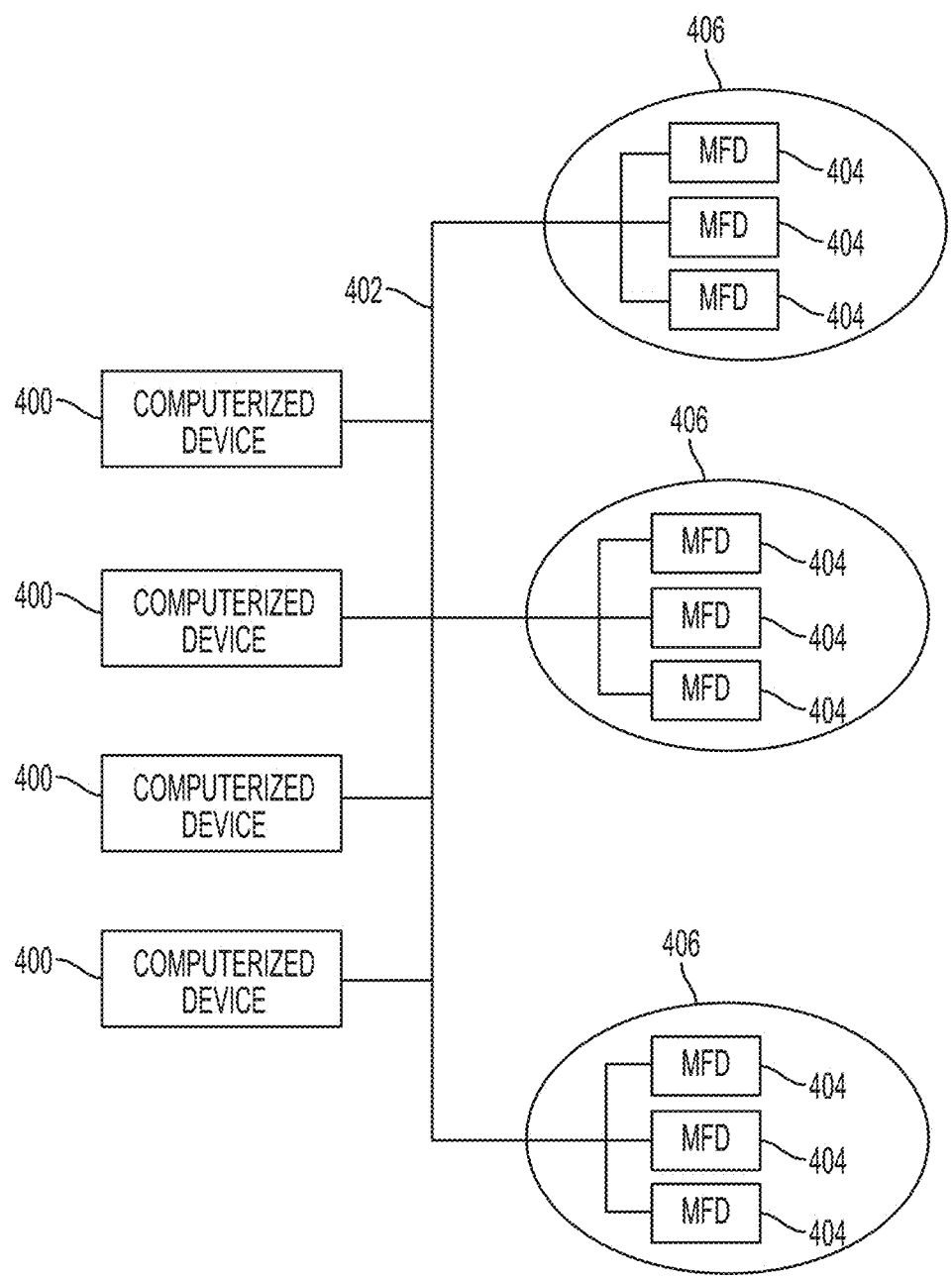
FIG. 12 is a schematic diagram illustrating systems herein.

As shown in FIG. 12, exemplary systems and methods herein include various computerized devices 400, 404 located at various different physical locations 406. The computerized devices 400, 404 can include print servers, printing devices, personal computers, etc., and are in communication (operatively connected to one another) by way of a local or wide area (wired or wireless) network 402. Therefore, the processing described above can be performed locally at a specific device that performs the scanning; or can be performed remotely, such as within an enterprise or cloud-based network device.

Figure 13:
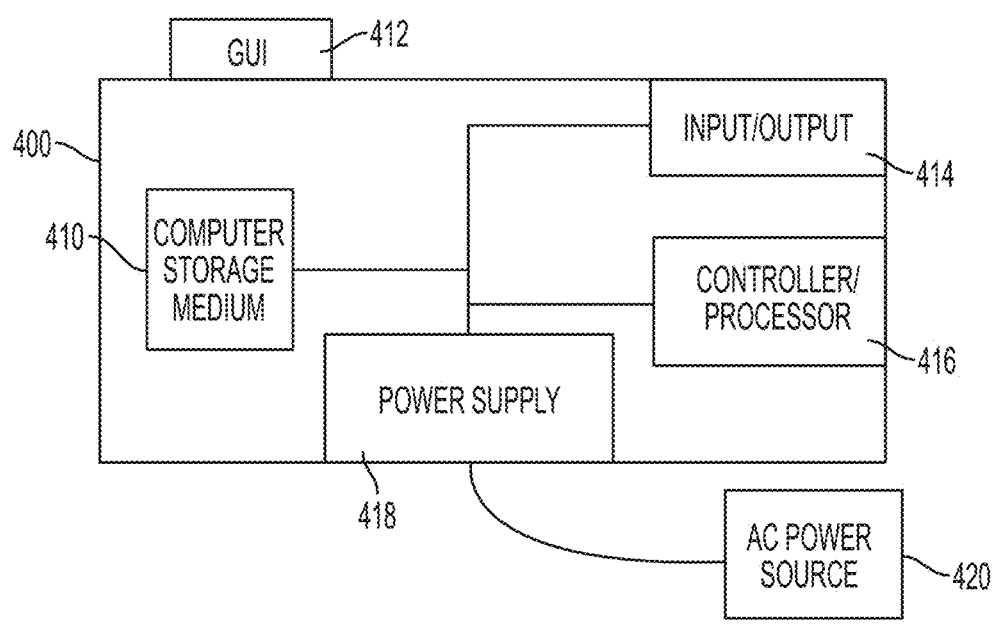
FIG. 13 is a schematic diagram illustrating devices herein.

FIG. 13 illustrates a computerized device 400, which can be used with systems and methods herein and can comprise, for example, a print server, a personal computer, a portable computing device, etc. The computerized device 400 includes a controller/tangible processor 416 and a communications port (input/output) 414 operatively connected to the tangible processor 416 and to the computerized network 402 external to the computerized device 400. Also, the computerized device 400 can include at least one accessory functional component, such as a graphical user interface (GUI) assembly 412. The user may receive messages, instructions, and menu options from, and enter instructions through, the graphical user interface or control panel 412.

The input/output device 414 is used for communications to and from the computerized device 400 and comprises a wired device or wireless device (of any form, whether currently known or developed in the future). The tangible processor 416 controls the various actions of the computerized device. A non-transitory, tangible, computer storage medium device 410 (which can be optical, magnetic, capacitor based, etc., and is different from a transitory signal) is readable by the tangible processor 416 and stores instructions that the tangible processor 416 executes to allow the computerized device to perform its various functions, such as those described herein. Thus, as shown in FIG. 13, a body housing has one or more functional components that operate on power supplied from an alternating current (AC) source 420 by the power supply 418. The power supply 418 can comprise a common power conversion unit, power storage element (e.g., a battery, etc), etc.

Figure 14:
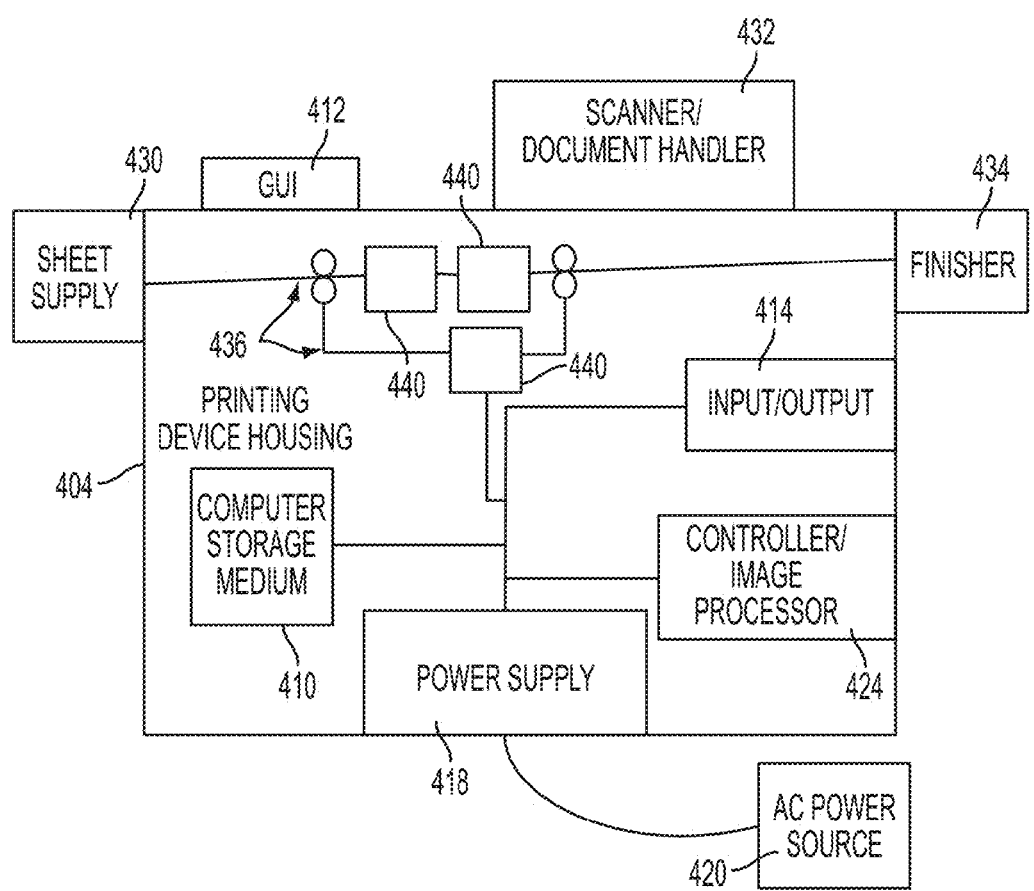
FIG. 14 is a schematic diagram illustrating devices herein.

FIG. 14 illustrates a computerized device that is a printing device 404, which can be used with systems and methods herein and can comprise, for example, a printer, copier, multi-function machine, multi-function device (MFD), etc. The printing device 404 includes many of the components mentioned above and at least one marking device (printing engine(s)) 440 operatively connected to a specialized image processor 424 (that is different than a general purpose computer because it is specialized for processing image data), a media path 436 positioned to supply continuous media or sheets of media from a sheet supply 430 to the marking device(s) 440, etc. After receiving various markings from the printing engine(s) 440, the sheets of media can optionally pass to a finisher 434 which can fold, staple, sort, etc., the various printed sheets. Also, the printing device 404 can include at least one accessory functional component (such as a scanner/document handler 432 (automatic document feeder (ADF)), etc.) that also operate on the power supplied from the external power source 420 (through the power supply 418). The one or more printing engines 440 are intended to illustrate any marking device that applies a marking material (toner, inks, etc.) to continuous media or sheets of media, whether currently known or developed in the future.

Therefore, as shown above, devices herein include, among other components, a device input (414, 432, etc.) receiving or generating an input image. For example, the scanner/document handler 432 can scan both sides of a page at once by moving the document past two individual scan modules. The document feeder 432 can employ, for example, a constant velocity transport (CVT) to move the document past the stationary scan stations, thereby reducing the time for copying or scanning 2-sided originals.

As noted above, the input image is made up of image pixels arranged in parallel rows of pixels and parallel columns of pixels (the rows of pixels are perpendicular to the columns of pixels). Also, an image processor 424 is operatively connected to the device input (414, 432, etc.), and a device output (414, 440, etc.) is operatively connected to the image processor 424.

The image processor 424 identifies the amount of image enlargement or image reduction to be performed on the input image (such is automatically determined or manually provided). For example, the user can input the amount of enlargement or image reduction through the control panel 412, or the processor 424 can automatically determine the enlargement or image reduction that should be performed by comparing the side-one and side-two scans as they are output by the document feeder/scanner 432.

Further, the image processor 424 determines the number of pixels to be added or removed within each of the rows (or columns) of pixels to accomplish the image enlargement or image reduction. The image processor 424 can determine the number of pixels to be added or removed within each of the rows of pixels by multiplying the amount of image enlargement or image reduction (in the form of a percentage) by the total number of pixels within each of the rows of pixels.

The image processor 424 evenly distributes the pixels that are to be added or removed along the full length of each of the rows of pixels, so as to position the pixels to be added or removed at regular, equal intervals along the full length of each of the rows of pixels. To evenly distribute the pixels in the rows, the image processor 424 divides the total number of pixels within each of the rows by the number of pixels that are to be added or removed, and the resulting value from that division process indicates the regular, equal pixel spacing between added/removed pixels.

Rather than just removing some pixels from the image, in order to maintain image quality, the image processor 424 adds or removes those pixels that will be added or removed in a process that eliminates artifacts that are created by the additional or missing pixels. Specifically, for each pixel that will be added or removed, the image processor 424 identifies a set of original pixels that are immediately adjacent to the pixel location that is to be added or removed. Also, when identifying this set of original pixels, the image processor 424 positions the location of the each pixel that is to be added or removed at the approximate center of the set of original pixels, along a corresponding row of the rows of pixels.

The image processor 424 then replaces each of the set of original pixels with a replacement set of pixels. Each of the replacement sets of pixels has one less pixel or one more pixel relative to the set of original pixels, based on whether image enlargement or image reduction is to be performed on the image. Also, each of the replacement pixels in a corresponding replacement set of pixels has a different data value, relative to a corresponding original pixel (in a corresponding one of the sets of original pixels).

Also, for each pixel that will be added or removed, the image processor 424 determines data values for replacement pixels in each of the replacement set of pixels by weighting data values from original pixels in the set of original pixels. These original pixels that are used in the weighting process can include a first pixel within the set of original pixels that has the same corresponding position as the replacement pixel, and another pixel within the set of original pixels that is adjacent to the first pixel. The weighting values are based on the amount of image enlargement or image reduction to be performed on the input image, and on the number of pixels in the replacement set of pixels. After the process of adding or removing the pixels is complete, the image processor 424 outputs an enlarged or reduced size version of the input image.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (processors), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners, and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are sometimes associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining pixel values from an image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network. In addition, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An image processing device comprising:
    an input device receiving an input image comprising original image pixels arranged in parallel rows of pixels;
    an image processor operatively connected to said input device, said image processor comprising registers simultaneously processing data in parallel; and
    an output device operatively connected to said image processor,
    said image processor determining a number of pixels to be added or removed within each of said rows of pixels of an image to accomplish an amount of image enlargement or reduction,
    said image processor evenly distributing said pixels to be added or removed along a full length of each of said rows of pixels,
    said image processor adding or removing said pixels to be added or removed in a process comprising:
        loading a set of original pixels that are immediately adjacent to each said pixel to be added or removed into each of said registers to have a location of said each pixel to be added or removed be at a center of said set of original pixels along a corresponding row of said rows of pixels;
        simultaneously replacing each said set of original pixels in each of said registers with a replacement set having one more or less pixel relative to said set of original pixels; and
        determining data values for replacement pixels in each said replacement set by weighting data values from original pixels in said set of original pixels, and
    after said adding or removing said pixels to be added or removed, said image processor outputting an enlarged or reduced size version of said input image.

2. The image processing device according to claim 1, said weighting being based on said amount of image enlargement or reduction and a number of pixels in said replacement set.

3. The image processing device according to claim 1, each of said replacement pixels in a corresponding replacement set having a different data value relative to a corresponding original pixel in a corresponding one of said sets of original pixels.

4. The image processing device according to claim 1, said image processor determining a number of pixels to be added or removed within each of said rows of pixels by multiplying said amount of image enlargement or reduction in the form of a percentage by a total number of pixels within each of said rows of pixels.

5. An image processing device comprising:
    an input device receiving an input image comprising original image pixels arranged in parallel rows of pixels and parallel columns of pixels, said rows of pixels being perpendicular to said columns of pixels;
    an image processor operatively connected to said input device, said image processor comprising registers simultaneously processing data in parallel; and
    an output device operatively connected to said image processor,
    said image processor automatically identifying an amount of image enlargement or image reduction to be performed on said input image,
    said image processor automatically determining a number of pixels to be added or removed within each of said rows of pixels to accomplish said amount of image enlargement or image reduction,
    said image processor automatically evenly distributing said pixels to be added or removed along a full length of each of said rows of pixels to position said pixels to be added or removed at regular intervals along said full length of each of said rows of pixels, said image processor automatically adding or removing said pixels to be added or removed in a process comprising, for each pixel to be added or removed:
loading a set of original pixels immediately adjacent to said each pixel to be added or removed into each of said registers to have a location of said each pixel to be added or removed be at a center of said set of original pixels along a corresponding row of said rows of pixels;
simultaneously replacing each said set of original pixels in each of said registers with a replacement set of pixels, each said replacement set of pixels having one less pixel or one more pixel relative to said set of original pixels based on whether said image enlargement or image reduction is to be performed on said image; and
determining data values for replacement pixels in each of said replacement set of pixels by weighting data values from original pixels in said set of original pixels, said original pixels comprising:
a first pixel within said set of original pixels having a same corresponding position as that of a corresponding one of said replacement pixels; and
a second pixel within said set of original pixels adjacent to said first pixel, and
after said adding or removing said pixels to be added or removed, said image processor automatically outputting an enlarged or reduced size version of said input image.

6. The image processing device according to claim 5, said weighting being based on said amount of image enlargement or image reduction to be performed on said input image and a number of pixels in replacement set of pixels.

7. The image processing device according to claim 5, each of said replacement pixels in a corresponding replacement set of pixels having a different data value relative to a corresponding original pixel in a corresponding one of said sets of original pixels.

8. The image processing device according to claim 5, said image processor determining a number of pixels to be added or removed within each of said rows of pixels by multiplying said amount of image enlargement or image reduction in the form of a percentage by a total number of pixels within each of said rows of pixels.

9. A method comprising:
receiving, into an image processor, an input image comprising original image pixels arranged in parallel rows of pixels, said image processor comprising registers simultaneously processing data in parallel;
determining a number of pixels to be added or removed within each of said rows of pixels of an image to accomplish an amount of image enlargement or reduction using said image processor;
evenly distributing said pixels to be added or removed along a full length of each of said rows of pixels using said image processor;
adding or removing said pixels to be added or removed using said image processor in a process comprising:
loading a set of original pixels that are immediately adjacent to each said pixel to be added or removed into each of said registers to have a location of said each pixel to be added or removed be at a center of said set of original pixels along a corresponding row of said rows of pixels;
simultaneously replacing each said set of original pixels in each of said registers with a replacement set having one more or less pixel relative to said set of original pixels; and determining data values for replacement pixels in each said replacement set by weighting data values from original pixels in said set of original pixels; and
after said adding or removing said pixels to be added or removed, outputting an enlarged or reduced size version of said input image from said image processor.

10. The method according to claim 9, said weighting being based on said amount of image enlargement or reduction and a number of pixels in said replacement set.

11. The method according to claim 9, each of said replacement pixels in a corresponding replacement set having a different data value relative to a corresponding original pixel in a corresponding one of said sets of original pixels.

12. The method according to claim 9, said determining a number of pixels to be added or removed within each of said rows of pixels comprising multiplying said amount of image enlargement or reduction in the form of a percentage by a total number of pixels within each of said rows of pixels.

13. A method comprising:
receiving, into an image processor, an input image comprising original image pixels arranged in parallel rows of pixels and parallel columns of pixels, said rows of pixels being perpendicular to said columns of pixels, said image processor comprising registers simultaneously processing data in parallel;
automatically identifying an amount of image enlargement or image reduction to be performed on said input image using said image processor;
automatically determining a number of pixels to be added or removed within each of said rows of pixels to accomplish said amount of image enlargement or image reduction using said image processor;
automatically evenly distributing said pixels to be added or removed along a full length of each of said rows of pixels to position said pixels to be added or removed at regular intervals along said full length of each of said rows of pixels using said image processor;
automatically adding or removing said pixels to be added or removed using said image processor in a process comprising, for each pixel to be added or removed:
loading a set of original pixels immediately adjacent to said each pixel to be added or removed added or removed into each of said registers to have a location of said each pixel to be added or removed be at a center of said set of original pixels along a corresponding row of said rows of pixels;
simultaneously replacing each said set of original pixels in each of said registers with a replacement set of pixels, each said replacement set of pixels having one less pixel or one more pixel relative to said set of original pixels based on whether said image enlargement or image reduction is to be performed on said image; and
determining data values for replacement pixels in each of said replacement set of pixels by weighting data values from original pixels in said set of original pixels, said original pixels comprising:
a first pixel within said set of original pixels having a same corresponding position as that of a corresponding one of said replacement pixels; and
a second pixel within said set of original pixels adjacent to said first pixel; and
after said adding or removing said pixels to be added or removed, automatically outputting an enlarged or reduced size version of said input image from said image processor.

14. The method according to claim 13, said weighting being based on said amount of image enlargement or image reduction to be performed on said input image and a number of pixels in said replacement set of pixels.

15. The method according to claim 13, each of said replacement pixels in a corresponding replacement set of pixels having a different data value relative to a corresponding original pixel in a corresponding one of said sets of original pixels.

16. The method according to claim 13, said determining a number of pixels to be added or removed within each of said rows of pixels comprising multiplying said amount of image enlargement or image reduction in the form of a percentage by a total number of pixels within each of said rows of pixels.

\* \* \* \* \*